United States Patent
Broberg

(10) Patent No.: US 6,466,834 B1
(45) Date of Patent: Oct. 15, 2002

(54) METHOD AND APPARATUS FOR CONVERSION OF VENTILATION SYSTEMS REPRESENTED IN COMPUTER-READABLE FORM

(75) Inventor: Björn Broberg, Torekov (SE)

(73) Assignee: Lindab AB, Bastad (SE)

( * ) Notice: Subject to any disclaimer, the term of this patent is extended or adjusted under 35 U.S.C. 154(b) by 0 days.

(21) Appl. No.: 09/329,585

(22) Filed: Jun. 10, 1999

(51) Int. Cl.[7] .......................... G06F 19/00; G01M 1/38; G05B 13/00; G05B 15/00; G05B 21/00
(52) U.S. Cl. .......................... 700/105; 700/97; 700/98; 700/117; 700/118; 700/276; 703/1
(58) Field of Search .......................... 700/105, 97, 98, 700/32, 33, 276, 301, 117, 118, 165; 703/1

(56) References Cited

U.S. PATENT DOCUMENTS

| | | | | |
|---|---|---|---|---|
| 3,867,616 A | * | 2/1975 | Korelitz et al. | 703/1 |
| 4,885,694 A | * | 12/1989 | Pray et al. | 705/400 |
| 5,537,326 A | * | 7/1996 | Fish | 700/182 |
| 5,920,849 A | * | 7/1999 | Broughton et al. | 705/400 |

* cited by examiner

Primary Examiner—Leo Picard
Assistant Examiner—Ryan Jarrett
(74) Attorney, Agent, or Firm—Weingarten, Schurgin, Gagnebin & Lebovici LLP

(57) ABSTRACT

A method for converting a representation of a ventilation duct system in a computer readable form from a first duct type to a second duct type, such as circular and rectangular ducts. The method identifies straight duct elements in the system, calculates an equivalent size of one or several duct elements of the second duct type to provide the same performance as the duct elements of the first duct type; and connects the duct element of the second duct type with connection duct elements in accordance with the connection of the corresponding elements in the original ventilation system, whereby a converted representation of the ventilation system is obtained.

27 Claims, 2 Drawing Sheets

METHOD AND APPARATUS FOR CONVERSION OF VENTILATION SYSTEMS REPRESENTED IN COMPUTER-READABLE FORM

FIELD OF THE INVENTION

The present invention relates to a method and an apparatus for converting a representation of a ventilation duct system, in a computer readable form, from a first duct type to a second duct type, such as circular and rectangular ducts.

BACKGROUND OF THE INVENTION

Ventilation duct systems, hereafter referred to as ventilation systems, could be constructed with different types of ducts, such as rectangular ducts, circular ducts, oval ducts etc. A circular duct is a duct which has a circular cross-section in which the fluidum (air) flows. Accordingly, a rectangular duct has a rectangular cross-section, etc. Different types of ducts have different properties, and are suitable for different conditions and situations. However, the choice of duct type is primarily dependent on which duct type the constructor and/or the engineer constructing the system is used to work with. Thus, certain duct types are often used, even though they are not the most appropriate In most cases, the circular ducts are the most suitable. The circular duct elements are quite similar in different systems, and could be provided as standard products, which makes them less costly. Less material are also needed to produce circular duct elements, and less isolation material is needed in case of isolated ducts. Further, the circular duct elements are easier to assemble and mount, and the assembled systems are also. easier to balance. Still further, the circular duct elements are easier to seal, and the generation of noise as well as the pressure loss are less. Consequently, ventilation systems with circular ducts are often to be preferred, compared to systems with rectangular ducts.

It is thus a problem, that many constructors are more comfortable using a certain duct type, e.g. rectangular ducts, in constructing ventilation systems, in spite of the duct type not being the most suitable.

Ventilation systems are nowadays usually constructed by means of software for computer aided design. Conversion between different duct types is possible. However, every duct element has to be converted manually, making the conversion a difficult and tedious task. The connection of the converted elements is also a problem. For this reasons the ventilation systems are usually mounted with the same type of duct elements that are used in the construction design.

There is therefore a need for an easier and more efficient method and apparatus for automatic conversion between ventilation systems with different duct types.

OBJECT OF THE INVENTION

It is therefore an object of the present invention to provide a method and an apparatus for converting a representation of a ventilation system, in a computer readable form, from a first duct type to a second duct type, such as circular and rectangular ducts, overcoming the above mentioned problems.

This object is achieved by means of a method, an apparatus and a computer-readable medium according to the enclosed claims.

SUMMARY OF THE INVENTION

According to the invention, a method for converting a representation of a ventilation system in a computer readable form from a first duct type to a second duct type, such as circular and rectangular ducts, comprises the steps of:

obtaining an original representation of a ventilation system comprising several straight duct elements and connecting duct elements, connecting said straight duct elements, of the first duct type;

identifying said straight duct elements in the obtained system;

calculating, for each or groups of identified straight duct elements, the equivalent size of one or several duct elements of the second duct type to provide the same performance as said duct elements of the first duct type; and connecting said duct elements of the second duct type with connection duct elements in accordance with the connection of the corresponding duct elements in the original ventilation system, whereby a converted representation of the ventilation system is obtained.

Hereby, a method, and a corresponding apparatus, is provided for efficient and adequate conversion of a ventilation system with duct elements of a first duct type to a ventilation system with duct elements of a second type. This makes it possible for a constructor used to work with a certain duct type, such as rectangular ducts, to construct systems with this duct type in a computer readable form, where after the ventilation system automatically is converted to a more suitable duct type, without changing the performance and properties of the system. By performance is here meant either that the came fall of pressure, i.e. pressure drop, is obtained for the same flow, or the same fall of pressure is obtained for the same flow velocity.

The conversion according to the invention is preferably made between rectangular ducts and circular ducts, and by use of the expression:

$$D_e = C^*(W^*H)^{0.625}/(W+H)^{0.250}$$

where $D_e$ is the equivalent diameter of a circular duct corresponding to a rectangular duct with the width W and the height H, and C is a constant, and preferably about 1.3. An equivalent expression could be used for the conversion from circular to rectangular ducts.

Further, the method preferably comprises the steps of:

defining a maximum height value for the ducts;

comparing the calculated diameter size of the circular ducts equivalent to the rectangular ducts with the maximum height value; and in case of the diameter being larger than the maximum height value, dividing the circular duct in two or more separate circular ducts with a corresponding total cross sectional area, and each having a diameter less than the maximum height value.

Hereby, the method automatically adapts to a height restriction defined by the user. Such restrictions are quite common, and by the inventive method the problem of circular ducts usually being higher than corresponding rectangular ducts are handled in an efficient manner.

Still further, in the case of a duct being divided in several separate ducts, the connection of the divided duct elements to other straight duct elements in the ventilation system preferably takes place in order of vicinity, whereby the closestducts are connected first. Hereby, the problem of connecting separated ducts is handled efficiently.

The original representation of the ventilation system is preferably created by means of a tool for computer aided design of ventilation systems, and the method according to the invention is further preferably a part of such a tool for computer aided design. Hereby, the method according to the invention could be incorporated in the normal working process, and the need for additional working steps and tools are avoided.

According to a preferred aspect of the invention, the method further comprises the additional temp of searching among available duct elements stored in a database for elements corresponding to the calculated straight duct elements of the second duct type or the connection duct elements, and, if such corresponding elements are found, replacing said element in the ventilation system by the element from the database. Hereby, the ventilation system could be automatically adapted to available standard elements or the like, making the implementation of the system easier and more efficient.

The invention further comprises an apparatus to execute the inventive method, as well as a corresponding computer-readable medium comprising a program tool with instructions to perform the steps according to the invention.

BRIEF DESCRIPTION OF THE DRAWINGS

For exemplifying purposes, the invention will be described in closer detail in the following with reference to embodiments thereof illustrated in the attached drawings, wherein.

DESCRIPTION OF PREFERRED EMBODIMENTS

Figure 3:
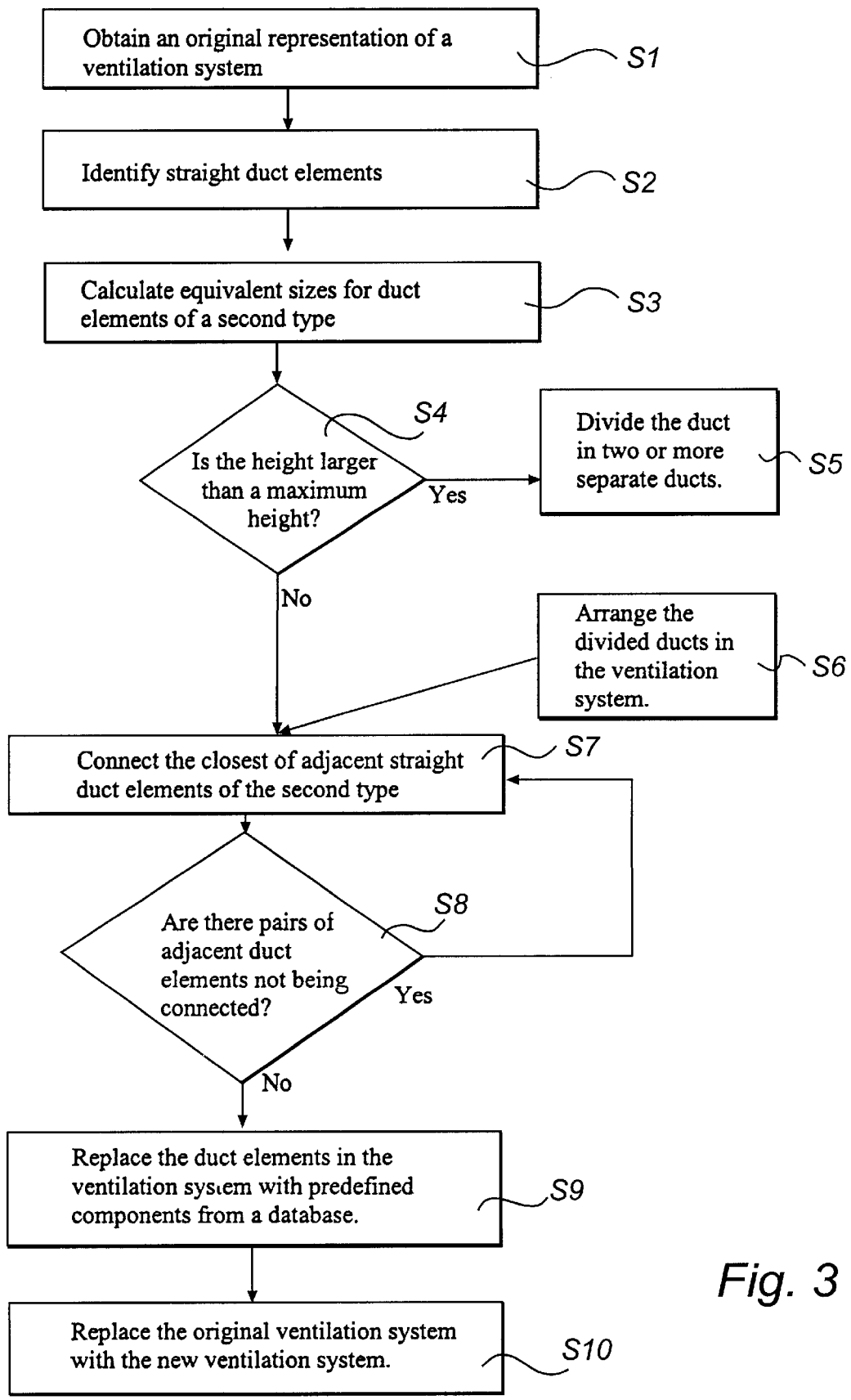
FIG. 3 is a schematic flow diagram of the conversion method according to the invention.

Referring to FIG. 3, a method for converting a representation of a ventilation duct system in a computer readable form from a first duct type to a second duct type according to a preferred embodiment of the invention should now be described. The invention is primarily directed to the conversion between rectangular ducts and circular ducts, and especially from rectangular to circular. However, conversion in the other direction is also possible by means of the invention. It is also possible to use the invention for conversion between other duct types, such as between circular and oval.

Figure 1:
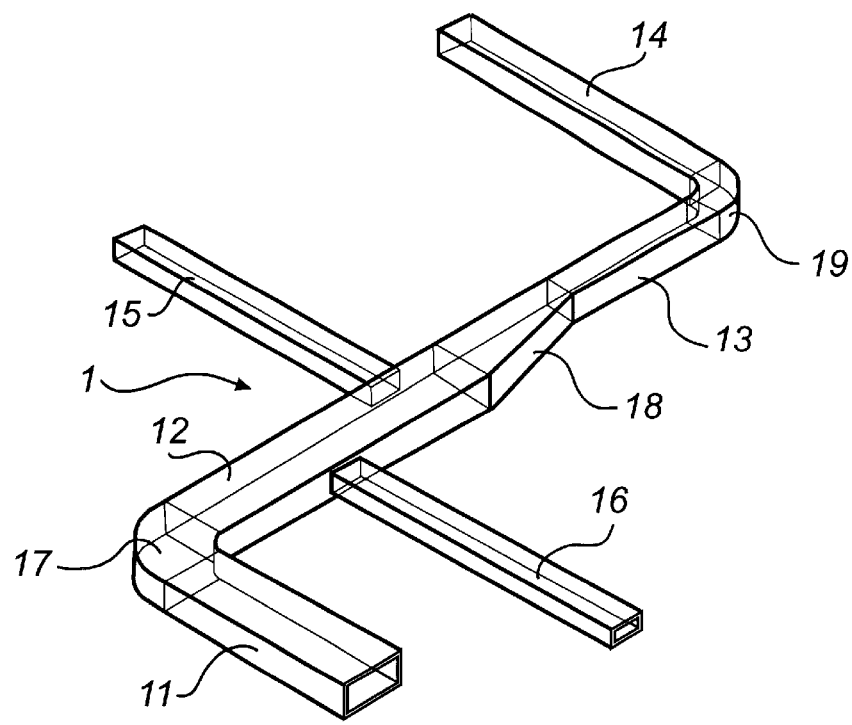
FIG. 1 is a schematic illustration of a ventilation system with rectangular ducts.

The method comprises a first step, S1, in which an original representation of a ventilation system is obtained, i.e. a ventilation system 1 with duct elements of a first duct type, such as rectangular A schematic example of such a ventilation system is shown in FIG. 1. The ventilation system comprises several straight duct elements 11–16 and connecting duct elements 17–19, connecting said straight duct elements. The straight duct components may also be directly connected to each other, in which case the connecting element could be considered as incorporated in the straight duct elements. The connecting elements comprise, in regard to this application, duct components such as bends, twin bends, branches, cross-pieces, tees, reducers, boots, end pieces, couplings, offsets, etc. In short, all duct components not being straight duct elements are in this application considered to be connecting elements.

The representation of the original ventilation system is preferably created in a design tool for computer aided design of ventilation systems. Such tools are commonly used by constructors and engineers constructing ventilation system, and e.g. the design tool CADvent®, provided by the applicant, could be used. However, other ways of obtaining computer-readable representations of ventilation systems may be used together with the invention.

In a second step, S2, the ventilation system is analysed to identify straight duct elements 11–16. Thereafter, in step S3, the equivalent size of straight duct elements of a second duct type, such as circular, are calculated. With equivalent is here meant that the calculated duct element provides the same performance as the duct elements of the first duct type. Performance is preferably defined as the same fall of pressure for the same flow, or the same fall of pressure for the same flow velocity.

In the case where a conversion from rectangular to circular is intended, the calculation may be made according to:

$$D_e = C*(W*H)^{0.625}/(W+H)^{0.250}$$

where $D_e$ is the equivalent diameter of a circular duct corresponding to a rectangular duct with the width W and the height H, and C is a constant, preferably about 1.3. An analogue expression may be used in the case of conversion from circular to rectangular, or in conversion between other duct types.

Further, the method preferably comprises a step S4, where the calculated height, i.e. the diameter in the case of circular ducts, is compared to a predefined maximum height value for the ducts. Such a maximum height value is preferably defined by the user prior to the conversion. In the case of the calculated height being larger than the maximum height value, the equivalent duct is divided into one or more separate ducts with a corresponding total cross sectional area, and each having a height less than the maximum height value, step S5. This step is especially important in conversion to circular ducts, while a circular duct normally has a diameter exceeding the height of a corresponding rectangular duct. However, in other conversions, such as from circular to rectangular, it may be omitted. In this latter case, the method may alternatively or additionally comprise the steps of identifying straight ducts being arranged in parallel and adjacent to each other, and during the conversion combining such adjacent ducts to a single rectangular duct, provided that the height of the rectangular duct does not exceed the maximum height value.

The division of the calculated duct is preferably made to provide ducts having the same size, i.e. the same diameter. However, ducting having different sizes may be used, and could be preferred in certain situations. The calculated duct in normally divided in two. However it may as well be divided into three or more. Preferably, a calculation is made prior to the division, to determine the smallest required denominator. Alternatively a loop is provided, whereby the duct is first divided in two, where after it is again determined whether the diameters are exceeding the maximum height value or not. If the diameters are to large, the denominator is increased with one, and the process is repeated, until a sufficient height is obtained.

The divisional ducts are preferably positioned in parallel to each other, and distributed in the width direction of the corresponding rectangular duct, step S6 Hereby, the total flow centre for the divided ducts, that is the centre of the total flow in all the ducts, are preferably the same as the flow centre for the original duct. However, the divided ducts are preferably separated by a distance normally ranging from 0.5–2 times the diameter for the ducts. The distance is preferably defined by the user, by inputting a value in a dialog box or the like. Further, this separation distance is preferably possible to define and alter by the user. Other ways of positioning the ducts may be used as well.

After the determination of the equivalent straight ducts of the second duct type, the straight duct elements are connected, by means of connection duct elements, in accordance with the connection of the corresponding duct elements in the original ventilation system, step S7. Thus, a first converted representation of the ventilation system is obtained.

In the case where a duct has been divided into several separate ducts, the connection of the divided duct elements to other straight duct elements in the ventilation system preferably takes place in order of vicinity, whereby the closest ducts are connected first, step S7. After the connection of the closest adjacently arranged ducts, a determination is made whether or not there are still pairs of adjacently arranged ducts not being connected. If this is the case, the connection step, S7, is repeated. Hereby, all ducts are connected, in order of vicinity, which is the most efficient way of connecting the ducts. In case two ducts should be connected to only one adjacently arranged duct, a determination is preferably made whether the flow in the single duct should accommodate the flow from both the divided ducts. If this is not the case, a decision from the user is requested.

Figure 2:
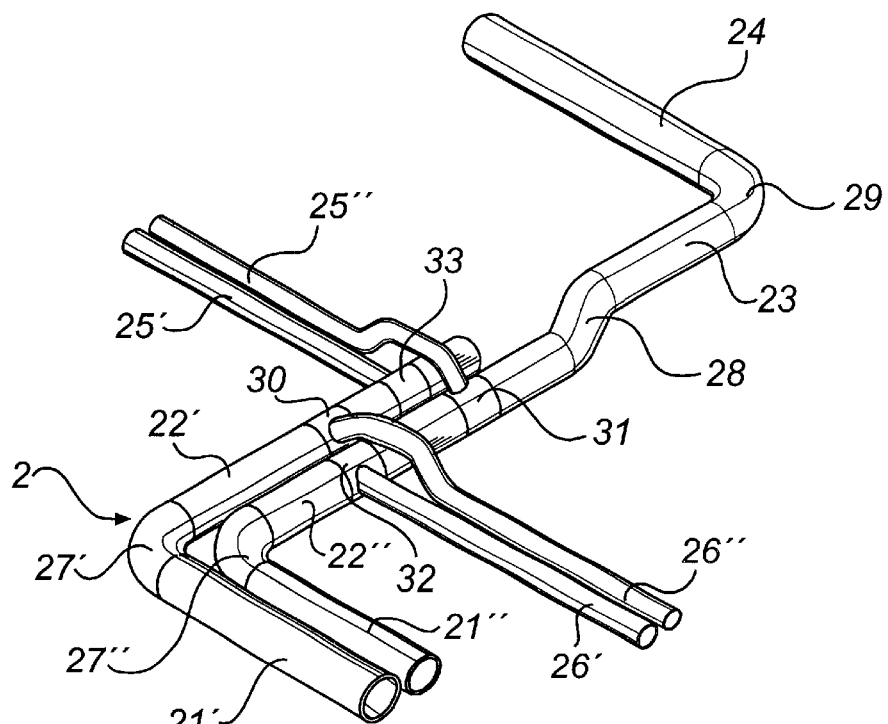
FIG. 2 is a schematic illustration of the ventilation system in FIG. 1 after a conversion to circular ducts.

In FIG. 2, there is shown a converted ventilation system 2 corresponding to the system shown in FIG. 1. As is clearly seen, some of the straight ducts 13, 14 in the original system 1 have been replaced by one circular duct 23, 24, while others 11, 12, 15, 16 have been replaced by two separate circular ducts 21', 21", 22', 22", 25', 25", 26', 26". In the first connection step, the single, i.e. non-divided, ducts 23 and 24 are connected by the element 29. Further, the closest ducts 21" and 22" are connected by 27"; 22" and 23 by 28; 25' and 22' by 33; and 26' and 22" by 32. Thereafter, the other ducts are connected, i.e. 21' and 22' by 27'; 22' and 26" by 30; and 22" and 25" by 31. It should be noted that the duct 22' is not connected to the duct 23. In this case, the reducer 18 could be implemented in a number of ways, and the method leaves it to the user to decide which way to choose.

The new, converted ventilation system could thereafter be re-dimensioned automatically. Hereby, the converted representation of the ventilation system is analysed according to flow parameters etc defined by the constructor, to adapt the duct elements in order to optimise the ventilation system, but preferably still with the same maximum height restriction. The optimisation could be made according to parameters such as size, performance or total cost.

The elements of the ventilation system may also, which is preferred, be compared to predefined components stored in a database. Hereby, elements corresponding to the calculated duct elements of the second duct type may be found, and if such corresponding elements are found, they replace the element in the ventilation system, step S9. The database may contain available standard products, provided by one or several suppliers of duct components. By the replacement of the calculated duct elements by the available products, the system becomes much cheaper, and also more easy to assemble and mount, while the part are easily connectable.

In cases where no similar or corresponding product could be found, the user is preferably notified in some way, for example by high-lighting or deleting the element. This provides the opportunity for the user to choose some other constructional design, where he could use available standard components.

The method described above could be implemented by use of an apparatus for converting a representation of a ventilation system in a computer readable form from a first duct type to a second duct type. Such an apparatus must comprise the means for execute the above mentioned steps of the method. Hence, the apparatus must comprise: means for obtaining the original representation of the ventilation system; means for identifying the straight duct elements in the obtained system; means for calculating, for each or groups of identified straight duct elements, the equivalent size of one or several duct elements of the second duct type to provide the same performance as the duct elements of the first duct type; means for connecting the duct elements of the second duct type with connection duct elements in accordance with the connection of the corresponding duct elements in the original ventilation system and means for storing said converted representation in a second storage means. The apparatus could be implemented with an general purpose computer, comprising memory means for obtaining the original ventilation system and for storing the converted system. The apparatus also preferably comprises a database comprising available duct elements, or a connection to such a database.

Hence, the method according to the invention could be implemented as a computer-readable medium, on which is stored a computer program of instructions for such a general purpose computer to perform the steps of the method.

Most preferably, the invention is implemented as a computer-readable medium, on which is stored a computer program of instructions for a general purpose computer to perform computer aided design of ventilation systems, and further to perform the steps of the method. Hereby, the constructor could design the ventilation system with any duct type, according to his wishes, in a design tool, and thereafter convert the system, directly in the design tool, to the duct type which is preferred in the present situation.

The invention has been described above in terms of a preferred embodiment. However, the scope of the invention should not be limited by this embodiment, and alternative embodiments of the invention are feasible, as should be appreciated by a person skilled in the art. For example, the conversion may be carried out between any types of ducts; the equivalent performance may be defined in a number of ways, depending on the situation; the computer-readable representation may be created and obtained in a number of ways, etc. Such embodiments should be considered to be within the scope of the invention, as it is defined by the appended claims.

What is claimed is:

1. A method for converting a representation of a ventilation system having a specified performance and properties, said representation in a computer readable form, from a first duct type to a second duct type wherein said duct types are specified by cross-sectional geometry, comprising the steps of:

obtaining an original representation of said ventilation system comprising straight duct elements and connecting duct elements, connecting said straight duct elements, of the first duct type;

identifying said straight duct elements in the obtained system;

calculating, for each or groups of identified straight duct elements, the equivalent size of one or several duct elements of the second duct type to provide the same performance as said duct elements of the first duct type; and connecting said duct elements of the second duct type with connection duct elements in accordance with the connection of the corresponding duct elements of the original ventilation system, wherein a converted representation of the ventilation system having the same specified performance and properties is obtained.

2. A method according to claim 1, wherein, in the calculation of the equivalent size for the duct elements of the second duct type, the size where the same fall of pressure is obtained for the same flow is calculated.

3. A method according to claim 2, wherein the conversion in made between rectangular ducts and circular ducts.

4. A method according to claim 3, wherein the calculation of equivalent size is made according to:

$$D_e = C * \frac{(W*H)^{0.625}}{(W+H)^{0.250}}$$

in the case of conversion from rectangular ducts to circular ducts, where De is the equivalent diameter of a circular duct corresponding to a rectangular duct with width w and the height H, and C is a constant and whereby the calculation is made in accordance with an analogue expression in the case of conversion from circular ducts to rectangular ducts.

5. A method according to claim 3, wherein, in the case of conversion from rectangular ducts to circular ducts, the method comprises the further steps of;

defining a maximum height value for the ducts;

comparing the calculated diameter size of the circular ducts equivalent to the rectangular ducts with the maximum height values and in case of the diameter being larger than the maximum height value, dividing the circular duct into two or more separate circular ducts with a corresponding total cross sectional area, and each having a diameter less than the maximum height value.

6. A method according to claim 5, wherein the circular duct is divided into ducts having the same diameter.

7. A method according to claim 5, wherein the divisional ducts are positioned in parallel to each other, and preferably distributed in the width direction of the corresponding rectangular duct, and with the total flow centre being the same as the flow centre for the original rectangular duct.

8. A method according to claim 5, wherein, in the case of a duct being divided into several separate ducts, the connection of the divided duct elements to other straight duct elements in the ventilation system takes place in order of vicinity, whereby the closest ducts are connected first.

9. A method according to claim 3, wherein, in the case of conversion from circular ducts to rectangular ducts, the method comprises the further steps of:

identifying straight ducts being arranged in parallel and adjacent to each other; and during the conversion combining said adjacent ducts to a single rectangular duct.

10. A method according to claim 1, wherein, in the calculation of the equivalent size for the duct elements of the second duct type, the size where the same fall of pressure is obtained for the same flow velocity is calculated.

11. A method according to claim 1, wherein the original representation of the ventilation system is created by means of a tool for computer aided design of ventilation systems.

12. A method according to claim 1, comprising the additional step of re-dimensioning the converted representation of the ventilation system, to adapt the duct elements in order to optimise the ventilation system.

13. A method according to claim 1, comprising the additional step of searching among available duct elements stored in a database for elements corresponding to the calculated straight duct elements of the second duct type or the connection duct elements, and, if such corresponding elements are found, replacing said element in the ventilation system by the element from the database.

14. A method according to claim 13, wherein the user is warned in cases where, for a certain element, no corresponding element could be found in the database, for example by high-lighting or deleting the element.

15. A method according to claim 13, wherein a decision by the user is requested in cases where, for a certain element, several possible corresponding element could be found in the database.

16. An apparatus for converting a representation of a ventilation system having a specified performance and properties, said representation in a computer readable form, from a first duct type to a second duct type, wherein said duct types are specified by cross-sectional geometry, comprising:

means for obtaining an original representation of said ventilation system comprising duct elements of the first duct type from a first storage means;

means for identifying straight duct elements in the obtained system;

means for calculating, for each or groups of identified straight duct elements, the equivalent size of one or several duct elements of the second duct type to provide the same performance as the duct elements of the first duct type;

means for connecting the duct elements of the second duct type with connection duct elements in accordance with the connection of the corresponding duct elements in the original ventilation system, wherein a converted representation of the ventilation system having the same specified performance and properties is obtained; and means for storing said converted representation in a second storage means.

17. An apparatus according to claim 16, wherein said means for calculation of the equivalent size for the duct elements of the second duct type, is adapted to calculate the size where the same fall of pressure is obtained for the same flow.

18. An apparatus according to claim 17, wherein, in the case of conversion from rectangular ducts to circular ducts, the apparatus further comprises:

means for defining a maximum height value for the ducts;

means for comparing the calculated diameter size of the circular ducts equivalent to the rectangular ducts with the maximum height value; and means for dividing the circular duct in two or more separate circular ducts with a corresponding total cross sectional area, and each having a diameter less than the maximum height value, in cases where the calculated diameter is larger than the maximum height value.

19. An apparatus according to claim 16, further comprising means for re-dimensioning the converted representation of the ventilation system, to adapt the duct elements in order to optimise the ventilation system.

20. An apparatus according to claim 16, further being connected to a database comprising available duct elements, and comprising means for searching the database for elements corresponding to the calculated straight duct elements of the second duct type or the connection duct elements, and, if such corresponding elements are found, for replacing said element in the ventilation system by the element from the database.

21. An computer-readable medium, on which is stored a computer program of instructions for a general purpose computer to perform the steps of:

obtaining an original representation of a ventilation system having a specified performance and properties in a computer readable form comprising several duct elements of a first duct type having a first cross-sectional geometry;

identifying straight duct elements in the obtained system;

calculating, for each or groups of identified straight duct elements, the equivalent size of one or several duct elements of a second duct type having a second cross-sectional geometry to provide the same performance as the duct elements of the first duct type; and connecting the duct elements of the second duct type with connection duct elements in accordance with the connection of the corresponding duct elements in the original ventilation system, wherein a converted representation of the ventilation system having the same specified performance and properties is obtained.

22. A computer-readable medium according to claim 21, wherein the program comprises instructions to perform the step of calculation of the equivalent size for the duct elements of the second duct type in such a manner that the size where the same fall of pressure is obtained for the same flow is calculated.

23. A computer-readable medium according to claim 22, wherein the program comprises instructions to, in case of conversion from rectangular ducts to circular ducts, perform the additional steps of:

defining a maximum height value for the ducts;

comparing the calculated diameter size of the circular ducts equivalent to the rectangular ducts with the maximum height value; and in case of the diameter being larger than the maximum height value, dividing the circular duct into two or more separate circular ducts with a corresponding total cross sectional area, and each having a diameter less than the maximum height value.

24. A computer-readable medium according to claim 21, wherein the program further comprises instructions to perform the step of re-dimensioning the converted representation of the ventilation system, to adapt the duct elements in order to optimise the ventilation system.

25. A computer-readable medium according to claim 22, wherein the program comprises instructions to perform the additional steps of searching among available duct elements stored in a database for elements corresponding to the calculated straight duct elements of the second duct type or the connection duct elements, and, if such corresponding elements are found, replacing said element in the ventilation system by the element from the database.

26. A computer-readable medium, on which is stored a computer program of instructions for a general purpose computer to perform computer aided design of ventilation systems, a further to perform the steps of:

obtaining an original representation of a ventilation system having a specified performance and properties in a computer-readable form comprising several duct elements of a first duct type having a first cross-sectional geometry;

identifying straight duct elements in the obtained system;

calculating, for each or groups of identified straight duct elements, the equivalent size of one or several duct elements of a second duct type having a second cross-sectional geometry to provide the same performance as the duct elements of the first duct type; and connecting the duct elements of the second duct type with connection duct elements in accordance with the connection of the corresponding duct elements in the original ventilation system, wherein a converted representation of the ventilation system having the same specified performance and properties is obtained.

27. The method according to claim 4 wherein the constant has a value about 1.3.

* * * * *

UNITED STATES PATENT AND TRADEMARK OFFICE
CERTIFICATE OF CORRECTION

PATENT NO. : 6,466,834 B1
DATED : October 15, 2002
INVENTOR(S) : Björn Broberg

It is certified that error appears in the above-identified patent and that said Letters Patent is hereby corrected as shown below:

Column 2,
Line 61, "closestducts" should read -- closest ducts --;

Column 3,
Line 5, "temp" should read -- step --; and

Column 7,
Line 19, "w" should read -- W --.

Signed and Sealed this

Fourth Day of November, 2003

JAMES E. ROGAN
*Director of the United States Patent and Trademark Office*